United States Patent [19]

Erhardt et al.

[11] Patent Number: 4,799,473

[45] Date of Patent: * Jan. 24, 1989

[54] GEARLIKE DRESSING TOOL

[75] Inventors: Manfred Erhardt, Puchheim; Herbert Loos, Dorfen-Stadt, both of Fed. Rep. of Germany

[73] Assignee: Carl Hurth Maschinen- und Zahnradfabrik GmbH & Co., Munich, Fed. Rep. of Germany

[*] Notice: The portion of the term of this patent subsequent to Jul. 7, 2004 has been disclaimed.

[21] Appl. No.: 118,194

[22] Filed: Nov. 6, 1987

[30] Foreign Application Priority Data

Nov. 14, 1986 [DE] Fed. Rep. of Germany ....... 3638966

[51] Int. Cl.$^4$ ............................................. B24B 53/06
[52] U.S. Cl. ............................. 125/11 CD; 51/206 P
[58] Field of Search .......... 125/11 CD, 11 CW, 11 R; 51/5 D, 287, 206 P, 206.5

[56] References Cited

U.S. PATENT DOCUMENTS 4,677,962 7/1987 Loos et al. .................... 125/11 CD Primary Examiner—Frederick R. Schmidt
Assistant Examiner—Blynn Shideler
Attorney, Agent, or Firm—Flynn, Thiel, Boutell & Tanis

[57] ABSTRACT

A gearlike dressing tool coated with extremely hard abrasive grains like diamond or CBN. To reduce the manufacturing expenses, not all but only a portion of the teeth is coated. The remaining teeth remain uncoated. The coated teeth lie always directly side-by-side in a peripheral direction and have, including the coating, the same tooth thickness as the teeth which are not coated.

5 Claims, 1 Drawing Sheet

GEARLIKE DRESSING TOOL

FIELD OF THE INVENTION

The invention relates to a gearlike dressing tool and, more particularly, to a gearlike tool having tooth flanks which are coated with grains of a hard material, for example, diamond or cubric boron nitride (CBN) grain.

BACKGROUND OF THE INVENTION

Such tools are generally known. For example, German OS No. 23 06 780 (corresponding to GB No. 1 392 704), shows a toothed base member coated with diamond grains on its flanks. A coating with grains of a cubic boron nitride (CBN) is described in German OS No. 32 02 695 (corresponding to GB No. 2 113 584).

The coating of the tool tooth flanks is, however, very complicated and thus expensive in particular in the case of tools having a large tooth count. In particular, the grinding of diamond coatings requires an enormous amount of time. If tools are to be dressed, which are needed for the precision working of only a small production run of work gears, then the total costs are often too high because of the high costs for the dressing tool.

It is therefore also already known to leave out entire teeth in gearlike dressing tools provided with a coating of extremely hard abrasive grains like diamond or CBN (German OS No. 33 46 189, which corresponds to U.S. Pat No. 4,677,962), so that only a smaller number than the nominal tooth count needs to be coated and ground. A disadvantage of these tools is, however, that they must be guided in the correct position into meshing engagement with the precision-working tool which is to be dressed. This demands partly rather complicated auxiliary means, like position indexing, point disengagement, guide wheels, etc.

The basic purpose of the invention is to provide a dressing tool of the abovedescribed type, avoiding the abovementioned disadvantages, which dressing tool can be manufactured quickly and inexpensively.

To attain the purpose, a dressing tool is provided wherein the coated teeth are provided in only one sector of the entire gear, wherein the remaining teeth are not coated and wherein the thickness of the noncoated teeth is at least approximately equal to the thickness of the coated teeth including the coating. The sector having the coated teeth could thereby theoretically extend from one tooth to a maximum z-1, wherein z is the total tooth count of the dressing tool. However, the 90° to 120° range for coated teeth has proven to be advantageous. This means that approximately one fourth to one third of all teeth have the coating, and that the thickness of the noncoated teeth must be approximately equal to the thickness of the coated teeth including the coating, because the dressing tool is usually used in the rolling method and unevenly thick teeth would lead to incorrect mating relationships.

A development wherein a sector with the coated teeth is releasably secured to the remaining part of the dressing tool, makes the manufacture of the teeth, which are of different thickness prior to the coating, easier.

The important advantage of the inventive dressing tool is the quicker and thus less expensive manufacturing capability compared with the known tools and the flexible possibility of use resulting therefrom. The life of the new dressing tool is shorter than the life of dressing tools wherein all of the teeth are coated. However, since the frequency of use of the inventive dressing tool is at the same time also correspondingly less, this disadvantage balances out again.

The field of application of the inventive dressing tool is the dressing of gearlike tools on socalled hard shaving machines, in which the spindle receiving this tool and the spindle receiving the work gear to be worked by it are connected through guide gears (German OS No. 33 04 980, which corresponds to U.S. Pat. No. 4,689,918). Due to the kinematic relationships during the hard shaving, the noncoated teeth are not worked during the dressing operation by the teeth of the abrasive tool to be dressed, since the latter teeth are profiled by the equally thick coated teeth so that the distance between the teeth of the dressing tool and tool to be dressed is maintained.

BRIEF DESCRIPTION OF THE DRAWINGS

The invention will be described hereinafter with reference to two exemplary embodiments, which are schematically illustrated in three figures, and in which.

DETAILED DESCRIPTION

Figure 1:
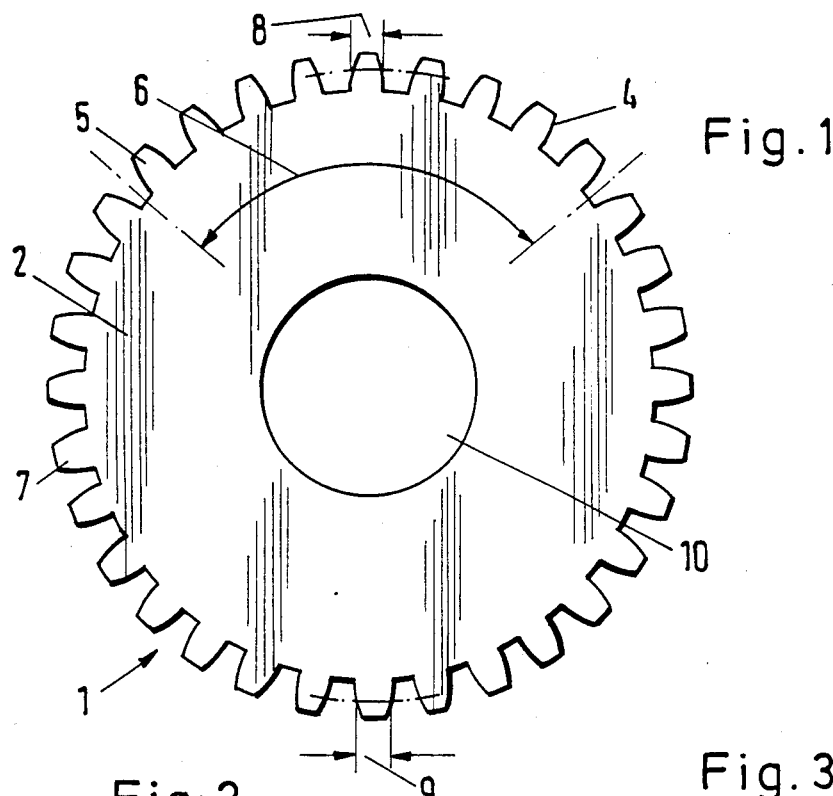
FIG. 1 is a side view of an inventive dressing tool in a one piece design.

FIG. 1 shows a side view of a one piece dressing tool 1. It consists of a cylindrically shaped metallic base member 2 having a central receiving bore 10 therethrough. The peripheral surface of the base member 2 has plural straight or helical teeth 5,7 thereon. A portion of the teeth 5,7 is provided with a coating 4 of particularly hard abrasive grains like diamond or cubic boron nitride (CBN) thereon. The coating of the tooth flanks and the grinding of the coated teeth 5 and the noncoated teeth 7 is known, so that this need not be discussed any further. The coated teeth 5 lie in peripheral direction directly one behind the other within a sector 6 extending over approximately 90° to approximately 120°. In other words: approximately one fourth to approximately one third of the total number of teeth 5,7 are coated, all remaining teeth are not coated. The tooth thickness 8 of the coated teeth 5, including the coating 4, corresponds thereby on the finished dressing tool 1 at least approximately with the tooth thickness 9 of the noncoated teeth 7. This means, that the teeth 5 which are to be coated must be manufactured correspondingly narrower before they become coated.

Figure 2:
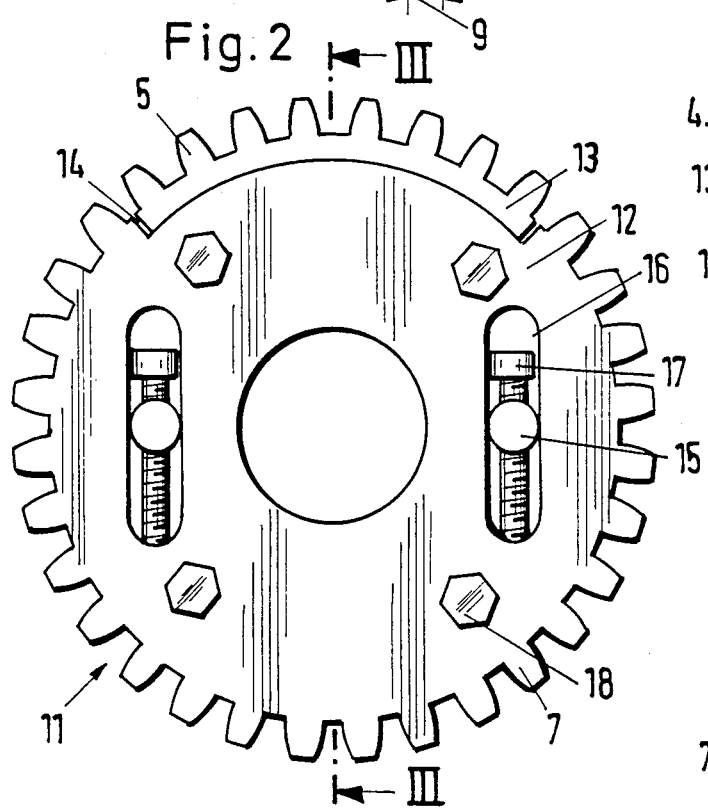
FIG. 2 is a view of an inventive dressing tool in a two piece design.
Figure 3:
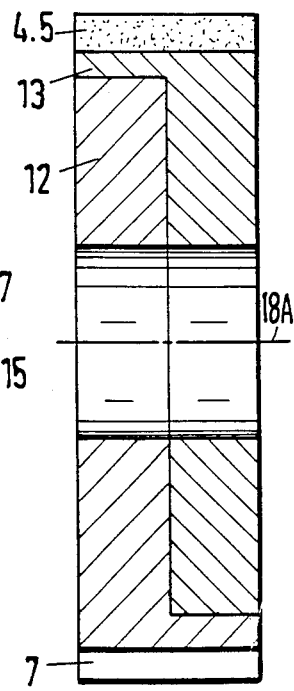
FIG. 3 is a cross-sectional view taken along the line III—III of the tool according to FIG. 2.

To produce unevenly wide teeth on a workpiece, however, requires expensive and complicated devices which are not always available. FIGS. 2 and 3 therefore illustrate a dressing tool 11 which can be manufactured on normal gear-cutting machines. The base member 2 is here composed of two parts 12,13. The first part 12 has the noncoated teeth 7 thereon and has a recess 14 into which the second part 13, which has the coated teeth 5 thereon, is inserted. Since it is very difficult to manufacture the second part 13 so that it interfits with the first part 12, namely, that it not only fits without clearance into the recess 14, but a pitch error also does not occur at the transition from the coated teeth 5 to the noncoated teeth 7, the two parts 12,13 can be adjusted and fixed in peripheral direction relative to one another. The second part 13 is for this purpose provided with lateral extending shoulders 15 which project into slotted holes 16 of the first part 12. The slotted holes 16 extend on a tangent to a circle concentric to the center of the base member 2. Screws 17 are screwed approximately on a tangent to a circle concentric to the center of the base member 2 into the shoulders 15, which screws each rest on one end of the slotted holes 16. By adjusting these screws 17, the parts 12,13 can be adjusted accurately relative to one another. They are subsequently connected together to form one unit by screws 18 that extend axially parallel to the axis of rotation 18A. Tight-fit screws are thereby preferably used or—in addition to the screws 18—fitting pins or the like (not illustrated) are provided.

The dressing tools 1,11 are illustrated only in a simplified form in FIGS. 1 to 3. In order to better understand the invention, unneeded details were omitted. In place of the illustrated straight tooth system, usually a helical tooth system will be provided in reality and in place of the illustrated bore 10 it is also possible to use other receiving means.

The embodiments of the invention in which an exclusive property or privilege is claimed are defined as follows:

1. In a dressing tool for dressing of abrasive gearlike precision-working tools, comprising a metallic, gearlike constructed base member which has plural teeth on its periphery, which teeth are coated with extremely hard abrasive grains, in particular diamond or cubic boron nitride, the improvement comprising wherein said coated teeth are provided in only one sector of the entire gear, wherein the remaining teeth are not coated and wherein the thickness of said uncoated teeth is at least approximately equal to the thickness of said coated teeth including said coating.

2. The dressing tool according to claim 1, wherein said sector with said coated teeth lies within an included angle of approximately 90 to 120 degrees.

3. The dressing tool according to claim 2, wherein said base member is comprised of two parts, said sector being on one of said two parts; wherein said sector with said coated teeth is releasably secured to the other of said two parts of said dressing tool.

4. The dressing tool according to claim 1, wherein said base member is comprised of two parts, said sector being on one of said two parts; wherein said sector with said coated teeth is releasably secured to the other of said two parts of said dressing tool.

5. The dressing tool according to claim 1, wherein said base member is a one piece construction.

* * * * *